US007315742B2

(12) United States Patent
Creamer et al.

(10) Patent No.: US 7,315,742 B2
(45) Date of Patent: Jan. 1, 2008

(54) VOICE-OVER IP MOBILE ROAMING USING SIP REFER

(75) Inventors: Thomas E. Creamer, Boca Raton, FL (US); Bill H. Hilf, La Habra, CA (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 10/736,140

(22) Filed: Dec. 15, 2003

(65) Prior Publication Data

US 2005/0130651 A1 Jun. 16, 2005

(51) Int. Cl.
*H04Q 7/20* (2006.01)
(52) U.S. Cl. ...................... 455/442; 370/331
(58) Field of Classification Search ............. 455/432.1, 455/436, 442, 448
See application file for complete search history.

(56) References Cited

U.S. PATENT DOCUMENTS

| 6,282,192 | B1 | 8/2001 | Murphy et al. |
| 6,363,065 | B1 | 3/2002 | Thornton et al. |
| 6,366,577 | B1 | 4/2002 | Donovan |
| 6,377,570 | B1 | 4/2002 | Vaziri et al. |
| 6,389,005 | B1 | 5/2002 | Cruickshank |
| 6,430,409 | B1 | 8/2002 | Rossmann |
| 6,434,143 | B1 | 8/2002 | Donovan |
| 6,526,131 | B1 | 2/2003 | Zimmerman et al. |
| 6,542,499 | B1 | 4/2003 | Murphy et al. |
| 7,072,317 | B2 * | 7/2006 | Vakil et al. .................. 370/332 |
| 2002/0122417 | A1 | 9/2002 | Miller et al. |
| 2004/0213209 | A1 * | 10/2004 | O'Connor et al. .......... 370/352 |
| 2004/0264410 | A1 * | 12/2004 | Sagi et al. ................... 370/331 |
| 2004/0266426 | A1 * | 12/2004 | Marsh et al. ............. 455/426.2 |
| 2005/0025164 | A1 * | 2/2005 | Kavanagh et al. .......... 370/401 |

FOREIGN PATENT DOCUMENTS

| EP | 0920176 | 6/1999 |
| EP | 1014667 | 6/2000 |
| EP | 1071246 | 1/2001 |
| WO | WO 00/72536 | 11/2000 |

* cited by examiner

*Primary Examiner*—Creighton Smith
(74) *Attorney, Agent, or Firm*—Akerman Senterfitt

(57) ABSTRACT

Within a mobile communications device, a method of roaming between a mobile network and a wireless network can include establishing a Voice-Over Internet Protocol communications link with an endpoint over which a call is conducted, wherein at least a portion of the call is conducted over the wireless network. The method further can include initiating a handoff of at least a portion of the call from the wireless network to the mobile network using a Session Initiation Protocol refer method and continuing the call using the mobile network for at least a portion of the call rather than the wireless network.

30 Claims, 2 Drawing Sheets

US 7,315,742 B2

VOICE-OVER IP MOBILE ROAMING USING SIP REFER

BACKGROUND

1. Field of the Invention

The invention relates to the field of mobile communications and, more particularly, to the use of wireless networking in conjunction with mobile networks.

2. Description of the Related Art

Wireless networks are becoming increasingly prevalent with thousands of so called hotspots being deployed throughout the United States, Europe, and Asia. A hotspot refers to the coverage area surrounding a wireless access point within which a device can communicate wirelessly with the access point. The access point typically includes a wireless transceiver and is connected to a packet-switched communications network such as the Internet. As such, the access point provides network connectivity to those devices capable of establishing a wireless communications link with the access point. Mobile users can roam between multiple hot spots while maintaining connectivity with a communications network. Examples of hotspots or wireless networks can include those networks built around one of the 802 wireless communications protocols such as 802.11, 802.16, 802.20, and 802.15.

Such wireless networks largely function independently of mobile communications networks. These wireless networks, particularly 802.11 wireless networks, often function purely as data networks. That is, typically voice communications are not carried over such networks. In consequence, the voice capability of mobile networks has yet to be integrated with 802.xx wireless networks.

SUMMARY OF THE INVENTION

The present invention provides a method, system, and apparatus that facilitates roaming between a mobile network and a wireless network without dropping a call. More particularly, the inventive arrangements disclosed herein utilize the Session Initiation Protocol refer method to handoff a call from a wireless network to a mobile network. As such, a subscriber can initiate and conduct a Voice-Over Internet Protocol (VOIP) call through a wireless access point of a wireless network. After initiating the VOIP call, the subscriber can roam to a location outside the range of the wireless access point, but within range of a mobile network. Accordingly, the VOIP call can be maintained as the portion of the call conducted over the wireless network is transferred to the mobile network using the SIP refer method. The SIP refer method is described in Internet Request For Comment (RFC) 3515.

One aspect of the present invention can include a method of roaming between a mobile network and a wireless network within a mobile communications device. Notably, the wireless network can be an 802 compliant network, for example an 802.11, 802.16, 802.20, or 802.15 wireless network. The method can include establishing a VOIP communications link with an endpoint over which a call is conducted. At least a portion of the call can be conducted over the wireless network. The method also can include initiating a handoff of at least a portion of the call from the wireless network to the mobile network using a Session Initiation Protocol refer method and continuing the call using the mobile network for at least a portion of the call rather than the wireless network.

The step of initiating a handoff can include sending a refer message to the endpoint via the VOIP communications link, receiving, via the mobile network, a signal from a Session Initiation Protocol gateway indicating an incoming mobile call from the endpoint, and sending a signal over the mobile network indicating acceptance of the incoming mobile call. The step of initiating a handoff further can include receiving an indication from the endpoint over the VOIP communications link that the Session Initiation Protocol gateway has accepted an invite from the endpoint, establishing a mobile communications link with the Session Initiation Protocol server. The endpoint also can be linked with the Session Initiation Protocol server through a second VOIP communications link, such that the call is maintained using the mobile network, and terminating the VOIP communications link with the endpoint.

Another aspect of the present invention can include a method of roaming between a mobile network and a wireless network within a gateway. During an established call over a VOIP communications link, wherein at least a portion of the call is conducted over the wireless network, the method can include handing off at least a portion of the call from the wireless network to the mobile network using a Session Initiation Protocol refer method. The method also can include continuing the call using the mobile network for at least a portion of the call rather than the wireless network.

The call can be conducted between a mobile device and an endpoint. Accordingly, the step of handing off at least a portion of the call can include receiving an invite from the endpoint, sending, over the mobile network, an indication of an incoming mobile call to the mobile device, receiving, over the mobile network, an indication of acceptance of the incoming mobile call from the mobile device, sending an indication to the endpoint that that the mobile call will be accepted, and establishing a mobile communications link with the mobile device and a VOIP communications link with the endpoint. As such, the call can be maintained using the mobile network. As noted, the wireless network can be an 802 compliant network.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
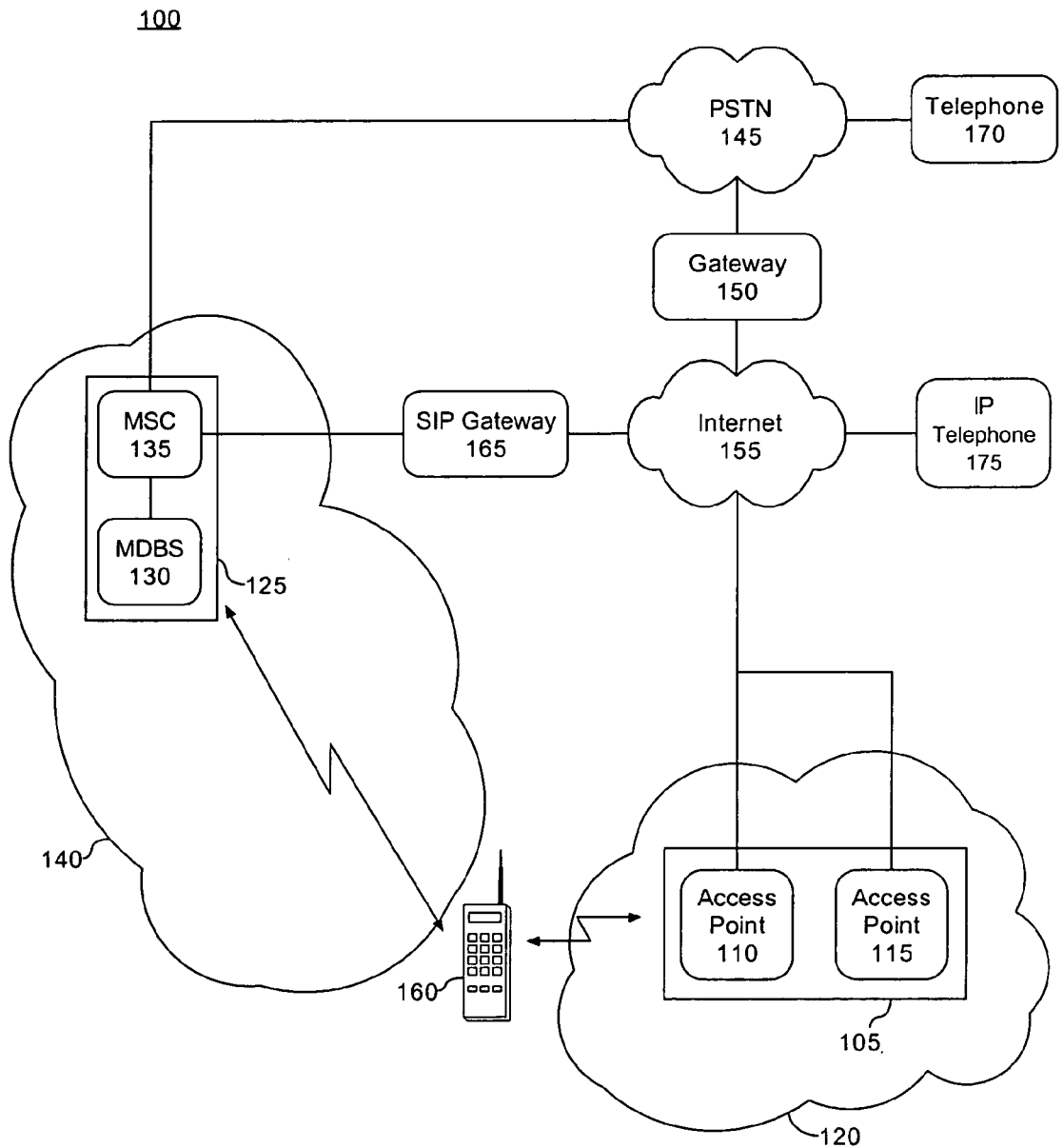
FIG. 1 is a schematic diagram illustrating a system for roaming between a mobile communications network and a wireless communications network in accordance with the inventive arrangements disclosed herein.

FIG. 1 is a schematic diagram illustrating a system 100 for roaming between a mobile communications network (mobile network) and a wireless communications network (wireless network) in accordance with the inventive arrangements disclosed herein. As shown, the system 100 can include one or more wireless networks 105, one or more mobile networks 125, a Public Switched Telephone Network (PSTN) 145, and a packet-switched network such as the Internet 155.

The wireless network 105 can be a wireless network that is compliant with any of the 802 communications protocols.

For example, the wireless network can be compliant with one of the 802.11, 802.16, 802.20, and/or 802.15 family of communications protocols. For example, the wireless network can be configured according to the 802.11a, b, g, or 802.15.3 wireless communications protocols. As such, the wireless network 105 can include one or more access points 110 and 115. Access points 110 and 115 each can include a wireless transceiver for communicating with one or more mobile communication devices capable of communicating over an 802.xx compliant wireless connection, for example mobile communications device 160. Each access point 110 and 115 further can include a wired connection to the Internet 155. Accordingly, each access point 110 and 115 can be configured to serve as an interface between wireless or mobile communications devices communicating over an 802.xx communications protocol and packet-switched networks such as the Internet 155. The wireless network 105 can have a coverage area 120 within which mobile communications device 160 can communicate over a wireless Voice-Over Internet Protocol (VOIP) channel or communications link.

The mobile network 125 can be any of a variety of different wireless telephony networks including, but not limited to, a conventional cellular telephony network or a Personal Communications Service (PCS) network (hereafter referred to as a "mobile network"). The mobile network 125 can include one or more Mobile Data Base Stations (MDBS) 130 and a Mobile Switching Center (MSC) 135. As shown, the mobile network 125 can have a coverage area 140 within which mobile communications device 160 can wirelessly communicate with the MDBS 130 over a mobile voice channel.

The MDBS 130 can send communications to and receive communications from wireless devices such as mobile communications device 160. For example, the MDBS 130 can include a tower (not shown) for wirelessly communicating with the mobile communications device 160. The tower can be communicatively linked with hardware and any necessary software within the MDBS 130 for converting data streams from the towers into valid signals and routing cellular (or mobile) switched data calls to the MSC 135 and/or to another mobile destination. The MDBS 130 manages and accesses the radio interface of the mobile communications device 160 from the mobile network side. The MSC 135 includes hardware and any necessary software for connecting calls by switching the digital voice data packets from one network path to another. For example, the MSC 135 can route calls between the MDBS 130, the PSTN 145, and/or the Session Initiation Protocol (SIP) gateway 165. Additionally, the MSC 135 can provide information such as user registration, authentication, and location updating.

The SIP gateway 165 can be an interface between the Internet 155 and the mobile network 125. SIP is a standard protocol for initiating interactive user sessions that involve multimedia elements such as video, voice, chat, gaming, and virtual reality. SIP works in the Application layer of the Open Systems Interconnection (OSI) communications model to establish, modify, and terminate multimedia sessions or Internet telephony calls. The protocol also can be used to invite participants to unicast or multicast sessions that do not necessarily involve the initiator. Because SIP supports name mapping and redirection services, SIP allows users to initiate and receive communications and services from any location, and for networks to identify the users wherever the user may be located.

SIP is a request-response protocol, dealing with requests from clients and responses from servers. Participants are identified by SIP Uniform Resource Locators (URL's). Requests can be sent through any transport protocol, such as User Datagram Protocol (UDP), Stream Control Transmission Protocol (SCTP), or Transmission Control Protocol (TCP). SIP determines the end system to be used for the session, the communication media and media parameters, and the called party's desire to engage in the communication. Once these parameters are assured, SIP establishes call parameters at either end of the communication, and handles call transfer and termination.

Accordingly, the SIP gateway 165 can include hardware and any necessary software for establishing communications links with both the mobile network 125 and the Internet 155. The SIP gateway 165 can receive SIP invites from communications devices such as mobile communications device 160, telephone 170, and/or IP telephone 175 and establish communications links with each, whether via the mobile network 125, the Internet 155, and/or the PSTN 145 by way of the gateway 150. While the SIP gateway 165 can serve as an interface to the Internet 155, the SIP gateway 165 also can be used as an interface to other packet-switched networks (not shown) such as Wide Area Networks, Local Area Networks, intranets, or the like.

The SIP gateway 165 can format convert received data from the mobile network 125 and/or the Internet 155 for transmission over a different one of the networks. In illustration, the SIP gateway 165 can receive data formatted for use over the mobile network 125 and packet-switched data for use over the Internet 155. With regard to the Internet 155 or other packet-switched networks, the SIP gateway 165 can send and receive VOIP formatted data for conducting calls over such networks. The SIP gateway 165 can convert data from one format to another so that data can be freely exchanged between the mobile network 125 and the Internet 155.

The PSTN 145 can include Service Switching Points (SSP), Signal Transfer Points (STP), and one or more switching systems (not shown). The SSP's are telephone switches interconnected by Switching System No. 7 (SS7) communication links. SSP's can perform call processing on calls that originate, tandem, or terminate at each respective site. The SSP's can generate SS7 messages to transfer call-related information to other SSP's or to query a Service Control Point (not shown) for routing instructions. The STP's are switches that relay messages between network switches and databases. The STP's can route SS7 messages to the correct outgoing signaling link based on SS7 message address fields.

The gateway 150 can serve as an interface between the PSTN 145 and the Internet 155. The gateway 150 can format packet-switched data from the Internet 155 for transmission over the PSTN 145 as circuit-switched data. Similarly, the gateway 150 can format convert circuit-switched data from the PSTN 145 to packet-switched data for transmission over the Internet 155.

The mobile communications device 160 can be configured to communicate over the mobile network 125 as well as the wireless network 105. The mobile communications device 160 can include transceivers for communicating over both mobile networks and wireless networks. Further, the mobile communications device 160 can be configured to measure the power of signals received from each network and vary the transmission strength of signals sent to each respective network. In addition, the mobile communications device 160 also can include a SIP user agent executing therein. The SIP user agent can encode and decode SIP formatted messages which are exchanged over the wireless network 105. In one embodiment of the present invention, the mobile communications device 160 can be implemented as a mobile phone. Still, those skilled in the art will recognize that any communications device configured as described herein can be used.

In operation, the mobile communications device 160 can communicate with the wireless network 105 via one of the access points 110 or 115. Accordingly, the mobile communications device 160 can establish VOIP calls via the wireless network 105 with either the telephone 170 or the IP telephone 175. Notably, both telephone 170 and IP telephone 175 can be configured to communicate using SIP as described herein. It should be appreciated that, while not shown, the mobile communications device 160 also can establish a call with another mobile device communicatively linked with the mobile network 125.

The mobile communications device can leave coverage area 120 of the wireless network and roam into the coverage area 140 of the mobile network 125. Accordingly, the mobile communications device 160 can initiate a transfer of at least a portion of the VOIP call from the wireless network to the mobile network. For example, the leg of the call conducted over the wireless network 105 can be handed off to the mobile network 125 such that the mobile communications device 160 can communicate with another endpoint or call participant, for example either telephone 170 or IP telephone 175 via the SIP gateway 165.

Figure 2:
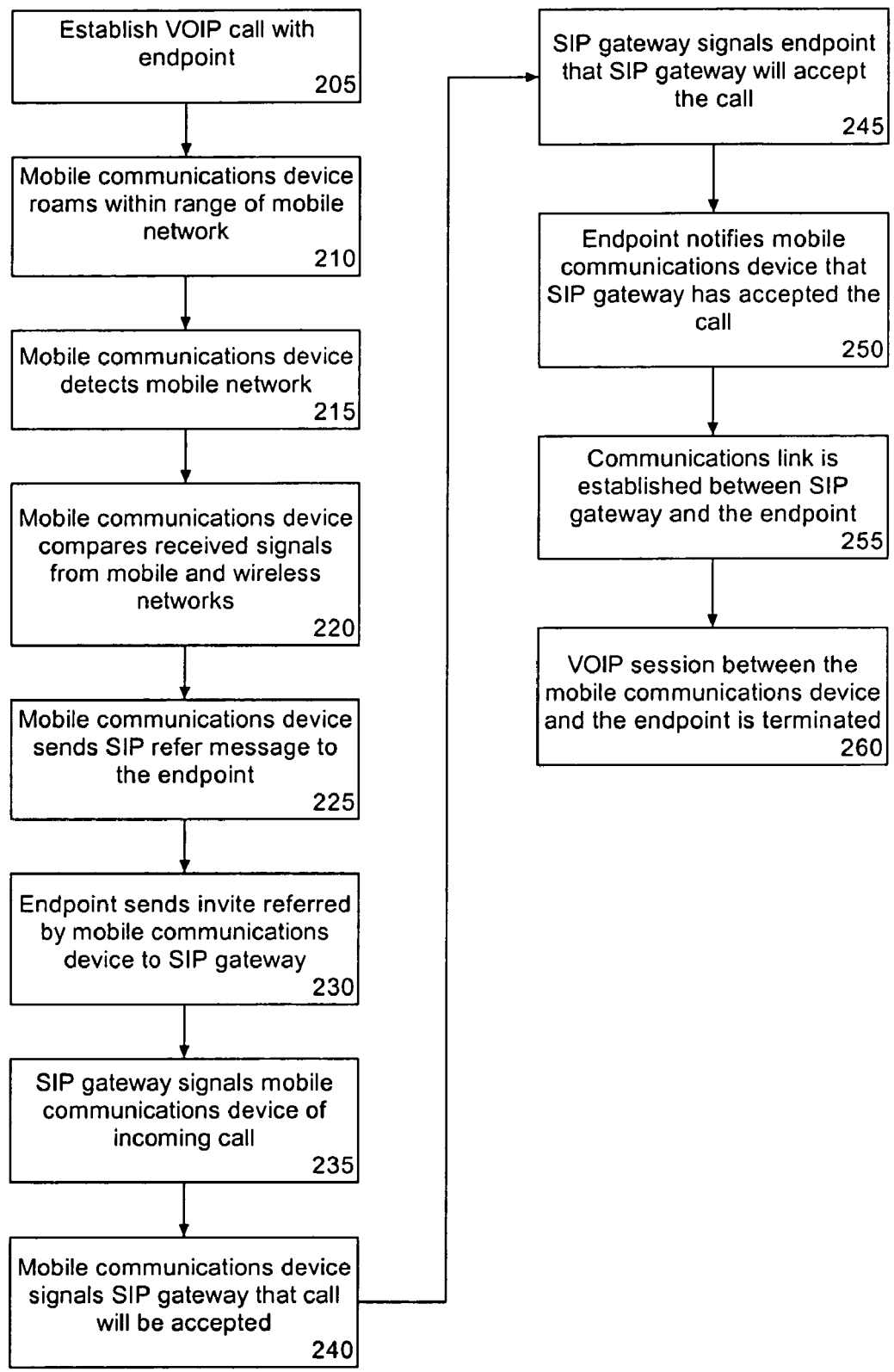
FIG. 2 is a flow chart illustrating a method of roaming between a mobile network and a wireless network in accordance with one aspect of the present invention.

FIG. 2 is a flow chart illustrating a method 200 of roaming between a mobile network and a wireless network in accordance with one aspect of the present invention. The method 200 can begin in a state where a user has a mobile communications device, such as a telephone, that is configured to communicate over mobile networks and an 802.xx compliant wireless network. Further, the mobile communications device can include a SIP user agent executing therein.

The method can begin in step 205 where a VOIP call is established between the mobile communications device and an endpoint. The VOIP call can be established such that the mobile communications device is communicatively linked with the Internet through a wireless network. More specifically, the mobile communications device can establish a wireless communications link with a wireless access point disposed within the wireless network, which provides connectivity to the Internet. The endpoint can be a conventional landline telephone connected to the PSTN and the Internet via a gateway, or can be an IP telephone connected with the Internet or another packet-switched network. The endpoint can be any of a variety of different voice communications devices capable of communicating using SIP as described herein.

In step 210, the mobile communications device can roam within range of a mobile network. In step 215, the mobile communications device can detect the mobile network. In step 220, the mobile communications device can compare the strength or power of detected signals from both the mobile network and the wireless network so that the call can be continued over the network having the strongest signal strength. For example, the mobile communications device can determine that the signal detected from the mobile network has more power than the signal detected from the wireless network. Accordingly, the mobile communications device can initiate a transfer of the VOIP call from the wireless network to the mobile network.

In step 225, the mobile communications device can send a SIP refer message to the endpoint. The SIP refer message can be sent using the established communication link over which the VOIP call takes place. In step 230, the endpoint sends the invite referred, or received, from the mobile communications device to the SIP gateway via the Internet. In step 235, the SIP gateway can signal the mobile communications device of an incoming mobile call. The SIP gateway signals the mobile communications device via the mobile network using standard mobile and/or cellular call setup techniques.

In step 240, the mobile communications device signals the SIP gateway that the mobile communications device will accept the incoming mobile call. The mobile communications device can respond via the mobile network using standard mobile call setup responses. As such, a mobile voice channel is established between the mobile communications device and the SIP gateway. In step 245, the SIP gateway signals the endpoint that it will accept the call. Accordingly, the endpoint can notify the mobile communications device via the VOIP call channel that the SIP gateway has accepted the call in step 250.

In step 255, a VOIP communications link is established between the endpoint and the SIP gateway. Accordingly, the mobile communications device is connected with the endpoint via the mobile voice channel to the SIP gateway, and via the VOIP communications channel from the SIP gateway to the endpoint. Still, it should be appreciated that if the endpoint is a conventional landline type of telephone, a portion of the call also can be conducted over the PSTN via a gateway disposed between the PSTN and the Internet. In step 260, the original VOIP communications link established in step 205 between the mobile communications device and the endpoint can be terminated. In consequence, the call has been transferred from the wireless network to the mobile network.

The method described herein has been provided for purposes of illustration only. As such, it should be appreciated that particular steps can be performed in varying order without departing from the spirit or essential attributes of the present invention.

The present invention provides a solution that allows mobile communications device users to roam freely between mobile networks and 802.xx wireless networks. The embodiments disclosed herein support both voice and data communications between mobile and wireless networks. As such, mobile users can continue to access both voice and data services whether in proximity to a mobile network or a wireless network as described herein.

The present invention can be realized in hardware, software, or a combination of hardware and software. Aspects of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

Aspects of the present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. Within a mobile communications device, a method of roaming between a mobile network and a wireless network comprising:

establishing a Voice-Over Internet Protocol communications link with an endpoint over which a call is conducted, wherein at least a portion of the call is conducted over the wireless network;

detecting the mobile network;

sending a Session Initiation Protocol (SIP) refer message to the endpoint over the wireless network, said SIP refer message identifying a SIP gateway associated with the mobile network;

receiving, over the mobile network, a signal from the SIP gateway indicating an incoming mobile call from the endpoint;

continuing the call using the mobile network rather than the wireless network for at least a portion of the call.

2. The method of claim 1, wherein said step of continuing the call comprises:

sending a signal to the SIP gateway over the mobile network indicating acceptance of the incoming mobile call;

receiving an indication from the endpoint over the wireless network that the Session Initiation Protocol gateway has accepted an invite from the endpoint;

establishing over the mobile network a mobile communications link to the endpoint though the SIP gateway, wherein the endpoint establishes a link with the SIP gateway over a second Voice-Over Internet Protocol communications link, such that the call is maintained using the mobile network; and terminating the Voice-Over Internet Protocol communications link with the endpoint over the wireless network.

3. The method of claim 1, wherein the wireless network is an 802 compliant network.

4. The method of claim 1, wherein the wireless network is an 802.11 compliant network.

5. The method of claim 1, wherein the wireless network is an 802.16, 802.20, or 802.15 compliant network.

6. Within a SIP gateway associated with a mobile network, a method of roaming between the mobile network and a wireless network comprising:

during an established call over a Voice-Over Internet Protocol communications link between a mobile communications device and an endpoint over a wireless network, receiving a Session Initiated Protocol (SIP) invite message from the endpoint, wherein the endpoint sends the SIP invite message in response to receiving a SIP refer message from the mobile communications device, wherein the mobile communications device sends the SIP refer message in response to detecting the mobile network;

signaling the mobile communications device over the mobile network of an incoming call from the endpoint; and continuing the call using the mobile network rather than the wireless network for at least a portion of the call.

7. The method of claim 6, said step of continuing comprising:

receiving, over the mobile network from the mobile device, an indication of acceptance of the incoming mobile call;

sending an indication to the endpoint that that the mobile call will be accepted; and establishing a mobile communications link with the mobile device and a second Voice-Over Internet Protocol communications link with the endpoint, thereby maintaining the call using the mobile network.

8. The method of claim 6, wherein the wireless network is an 802 compliant network.

9. The method of claim 6, wherein the wireless network is an 802.11 compliant network.

10. The method of claim 6, wherein the wireless network is an 802.16, 802.20, or 802.15 compliant network.

11. A mobile communications device capable of roaming between a mobile network and a wireless network, said mobile communications device comprising:

establishing a Voice-Over Internet Protocol communications link with an endpoint over which a call is conducted, wherein at least a portion of the call is conducted over the wireless network;

means for detecting the mobile network;

means for sending a Session Initiation Protocol (SIP) refer message to the endpoint over the wireless network, said SIP refer message identifying a SIP gateway associated with the mobile network;

means for receiving, over the mobile network, a signal from the SIP gateway indicating an incoming mobile call from the endpoint;

and means for continuing the call using the mobile network rather than the wireless network for at least a portion of the call.

12. The system of claim 11, said means for continuing the call comprising:

means for sending a signal to the SIP gateway over the mobile network indicating acceptance of the incoming mobile call;

means for receiving an indication from the endpoint over the wireless network that the Session Initiation Protocol gateway has accepted an invite from the endpoint;

means for establishing over the mobile network a mobile communications link to the endpoint through the SIP gateway, wherein the endpoint establishes a link with the SIP gateway over a second Voice-Over Internet Protocol communications link, such that the call is maintained using the mobile network; and means for terminating the Voice-Over Internet Protocol communications link with the endpoint over the wireless network.

13. The system of claim 11, wherein the wireless network is an 802 compliant network.

14. The system of claim 11, wherein the wireless network is an 802.11 compliant network.

15. The system of claim 11, wherein the wireless network is an 802.16, 802.20, or 802.15 compliant network.

16. A system configured to facilitate roaming between a mobile network and a wireless network comprising:

during an established call over a Voice-Over Internet Protocol conirnunications link between a mobile communications device and an endpoint over a wireless network, means for receiving a Session Initiated Protocol (SIP) invite message from the endpoint, wherein the endpoint sends the SIP invite message in response to receiving a SIP refer message from the mobile communications device, wherein the mobile communications device sends the SIP refer message in response to detecting the mobile network;

means for signaling the mobile communications device over the mobile network of an incoming call from the endpoint; and means for continuing the call using the mobile network rather than the wireless network for at least a portion of the call.

17. The system of claim 16, said means for continuing comprising:

means for receiving, over the mobile network from the mobile device, an indication of acceptance of the incoming mobile call;

means for sending an indication to the endpoint that that the mobile call will be accepted; and means for establishing a mobile communications link with the mobile device and a second Voice-Over Internet Protocol communications link with the endpoint, thereby maintaining the call using the mobile network.

18. The system of claim 16, wherein the wireless network is an 802 compliant network.

19. The system of claim 16, wherein the wireless network is an 802.11 compliant network.

20. The system of claim 16, wherein the wireless network is an 802.16, 802.20, or 802.15 compliant network.

21. A computer-readable storage medium, having stored thereon a computer program having a plurality of code sections executable by a machine for causing the machine to perform the steps of:

establishing a Voice-Over Internet Protocol communications link with an endpoint over which a call is conducted, wherein at least a portion of the call is conducted over the wireless network;

detecting the mobile network;

sending a Session Initiation Protocol (SIP) refer message to the endpoint over the wireless network, said SIP refer message identifying a SIP gateway associated with the mobile network;

receiving, over the mobile network, a signal from the SIP gateway indicating an incoming mobile call from the endpoint; and continuing the call using the mobile network rather than the wireless network for at least a portion of the call.

22. The computer-readable storage medium of claim 21, wherein said step of continuing the call comprises:

sending a signal to the SIP gateway over the mobile network indicating acceptance of the incoming mobile call;

receiving an indication from the endpoint over the wireless network that the Session Initiation Protocol gateway has accepted an invite from the endpoint;

establishing over the mobile network a mobile communications link to the endpoint through the SIP gateway, wherein the endpoint establishes a link with the SIP gateway over a second Voice-Over Internet Protocol communications link, such that the call is maintained using the mobile network; and terminating the Voice-Over Internet Protocol communications link with the endpoint over the wireless network.

23. The computer-readable storage medium of claim 21, wherein the wireless network is an 802 compliant network.

24. The computer-readable storage medium of claim 21, wherein the wireless network is an 802.11 compliant network.

25. The computer-readable storage medium of claim 21, wherein the wireless network is an 802.16, 802.20, or 802.15 compliant network.

26. A computer-readable storage medium, having stored thereon a computer program having a plurality of code sections executable by a machine for causing the machine to perform the steps of:

during an established call over a Voice-Over Internet Protocol communications link between a mobile communications device and an endpoint over a wireless network, receiving a Session Initiated Protocol (SIP) invite message from the endpoint, wherein the endpoint sends the SIP invite message in response to receiving a SIP refer message from the mobile communications device, wherein the mobile communications device sends the SIP refer message in response to detecting the mobile network;

signaling the mobile communications device over the mobile network of an incoming call from the endpoint; and continuing the call using the mobile network rather than the wireless network for at least a portion of the call.

27. The computer-readable storage medium of claim 26, said step of continuing comprising:

receiving, over the mobile network from the mobile device, an indication of acceptance of the incoming mobile call;

sending an indication to the endpoint that that the mobile call will be accepted; and establishing a mobile communications link with the mobile device and a second Voice-Over Internet Protocol communications link with the endpoint, thereby maintaining the call using the mobile network.

28. The computer-readable storage medium of claim 26, wherein the wireless network is an 802 compliant network.

29. The computer-readable storage medium of claim 26, wherein the wireless network is an 802.11 compliant network.

30. The computer-readable storage medium of claim 26, wherein the wireless network is an 802.16, 802.20, or 802.15 compliant network.

* * * * *